March 15, 1966  C. JONES  3,240,423
COMPOSITE SHAFT FOR ROTARY COMBUSTION ENGINE
Filed May 14, 1965  3 Sheets-Sheet 2
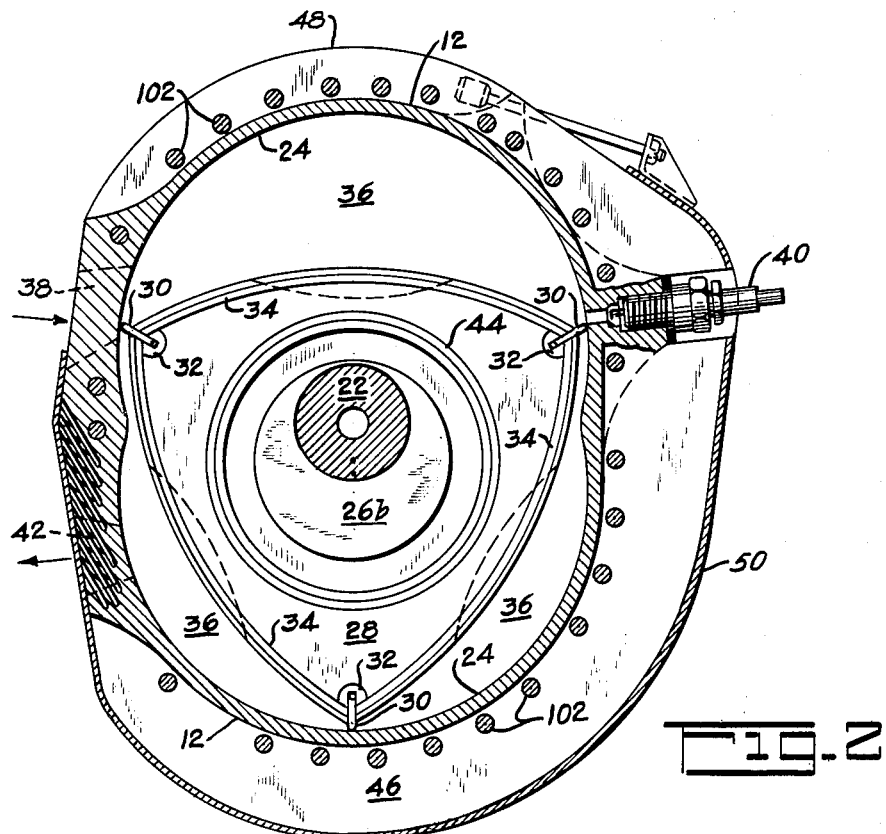
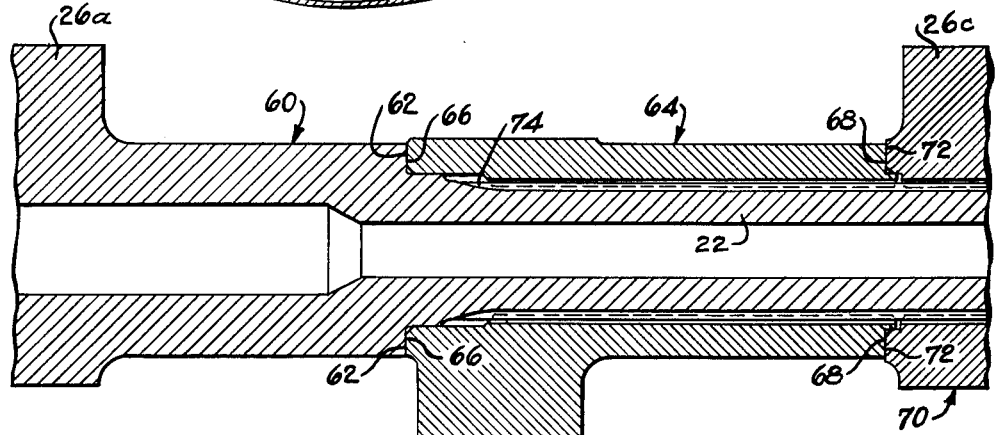
INVENTOR.
CHARLES JONES
BY Julian Falk
ATTORNEY

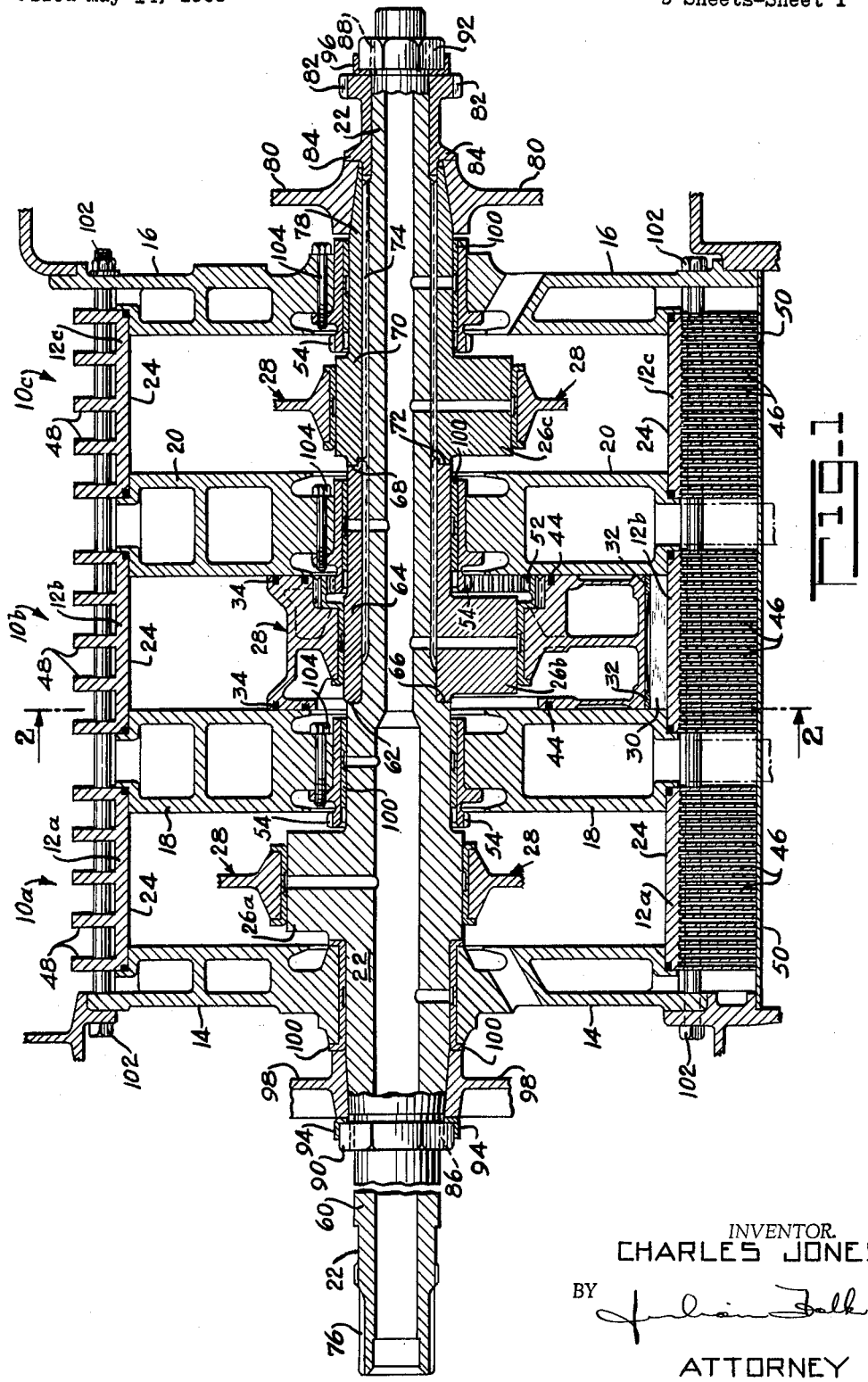

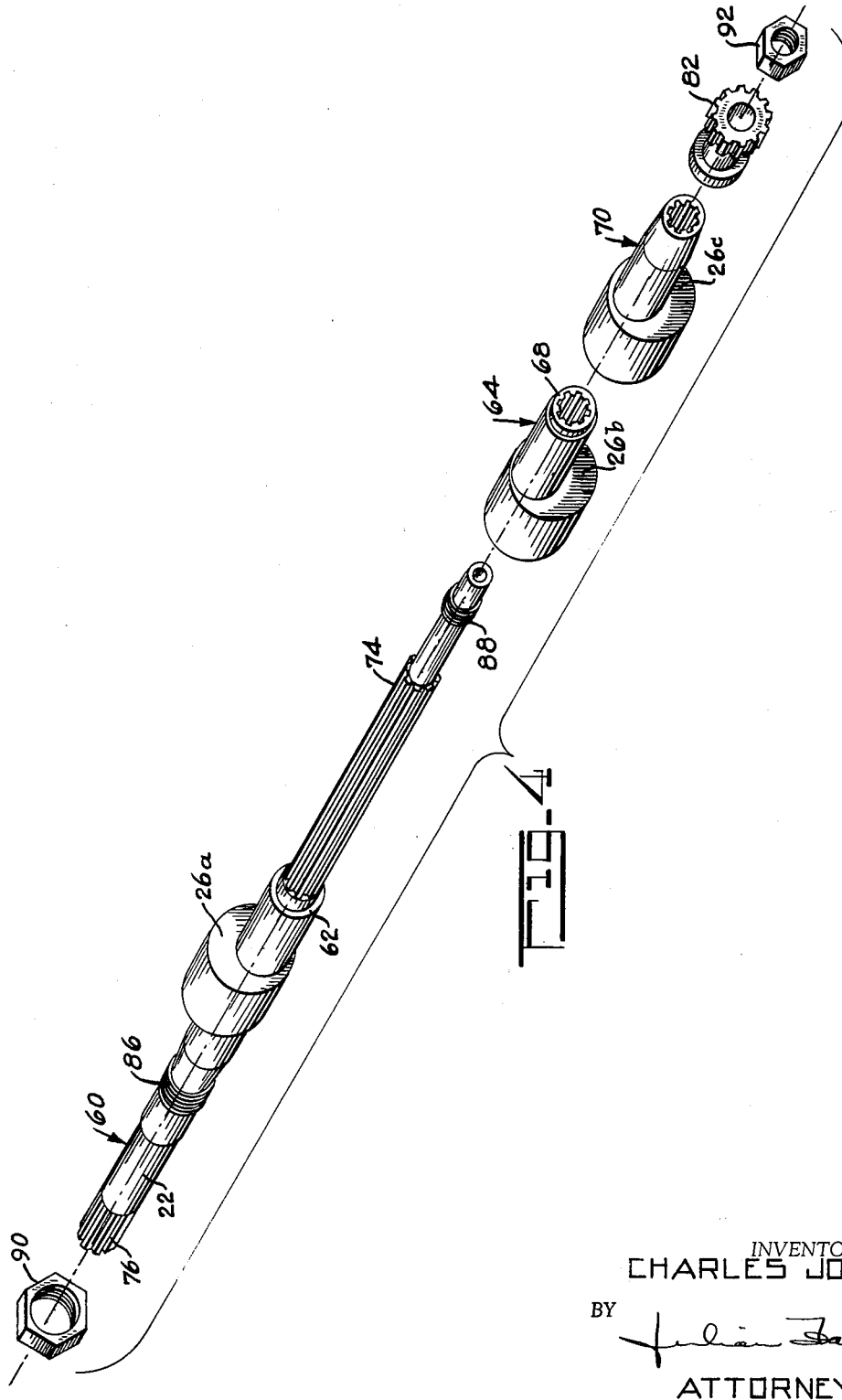

United States Patent Office 3,240,423
Patented Mar. 15, 1966

3,240,423
COMPOSITE SHAFT FOR ROTARY COMBUSTION
ENGINE
Charles Jones, Paramus, N.J., assignor to Curtiss-Wright
Corporation, a corporation of Delaware
Filed May 14, 1965, Ser. No. 455,838
9 Claims. (Cl. 230—145)

This invention relates to rotary mechanisms such as pumps, fluid motors and internal combustion engines and is particularly directed to the novel multi-piece shaft for use in a multi-unit rotary mechanism. For convenience, the rotary mechanism described herein will take the form of an internal combustion engine, although it is not intended that the invention be so limited.

Rotary combustion engines of the type described herein generally comprise an outer body composed of a peripheral wall interconnected with a pair of end walls to form a cavity whose profile preferably is basically an epitrochoid. An inner body or rotor is rotatably supported on a shaft mounted within said outer body which shaft is coaxial with the cavity. The rotor is rotatable relative to the outer body such that the apex portions continuously engage the inner surface of the peripheral wall to form a plurality of working chambers which vary in volume during engine operation. An intake port is provided for admitting air or a fuel-air mixture to said working chambers for combustion therein and an exhaust port is provided for expelling the burnt gases from said engine. An ignition means may be provided for igniting the fuel-air mixture or, if the engine is run on the diesel cycle, the ignition means may be eliminated. During engine operation the sequence of intake, compression, expansion and exhaust is carried out, similar to that which takes place in a conventional reciprocating-type internal combustion engine.

It is known in the rotary combustion engine art that the output of the engine can be increased by adding additional rotor and housing nuits as for example by coupling the shafts of a plurality of said housing and rotary units together. It is also known that such multi-unit rotary combustion engines may be constructed by providing a single housing with a plurality of cavities with a corresponding number of rotors. It has been previously believed that when constructing the latter type multi-unit rotary combustion engine a one-piece shaft had to be used since split shafts were believed to be structurally weak. Through the present invention however, a multi-unit rotary combustion engine is provided with a plurality of cavities and rotors which engine has a multi-part crankshaft which through the novel construction of the invention is substantially equivalent of a one-piece crankshaft of the same size insofar as the stiffness and strength of the shaft are concerned. Further, through the use of the novel construction of the shaft of the invention, the gears, bearings and intermediate housings need not be split into sections as was required in some prior embodiments of multi-unit engines.

The invention is generally carried out by providing a plurality of axially-aligned rotor housings interconnected by at least one intermediate housing to form a multi-unit rotary mechanism or combustion engine. A rotor is positioned in each of the rotor housing cavities and is rotatably supported on an eccentric portion of the crankshaft extending axially through the engine. The crankshaft comprises a first elongated member which extends axially through both ends of the engine and carries an eccentric portion integral therewith and at least one other shaft member is removably mounted on the extended section of the first elongated member with the other member having an eccentric portion integral therewith and axially spaced from the first eccentric member. The separable shaft members, each carrying an eccentric portion, are clamped together by providing a clamping nut or the like at each end of the shaft which is tightened to clamp the two sections in non-slip relationship. Shoulder means are provided on each section which shoulder means are disposed in mating relationship and when the shaft is clamped together the shoulder means are disposed in non-slip relationship so that the shaft acts as a unitary or one-piece shaft member. Since the shaft can be readily assembled and disassembled there is no requirement for providing split gears and split bearings or split intermediate housings since the shaft can be first disassembled with the eccentric portions thereof separating with their respective shaft portions so that the bearings and gears and the housing parts can be assembled piece by piece without requiring them to be split for assembly purposes.

It is therefore one object of the invention to provide a novel shaft construction for a rotary combustion engine.

It is another object of the invention to provide a novel and improved multi-piece shaft construction for a multi-unit rotary combustion engine.

It is still another object of the invention to provide a novel and improved shaft construction for a rotary combustion engine having a plurality of axially aligned units which multi-unit engine does not require split housings, gears or bearings.

It is an additional object of the invention to provide a novel and improved multi-part shaft construction for a rotary combustion engine which shaft construction has structural operating characteristics substantially the same as a one-piece shaft.

Other objects and advantages of the invention will become apparent upon reading the following detailed description in connection with the drawings in which:

FIG. 1 is a sectional view of a multi-unit rotary combustion engine embodying the present invention;

FIG. 2 is a sectional view taken along line 2—2 of FIG. 1;

FIG. 3 is an enlarged partial sectional view showing a portion of the multi-part construction of the shaft of the invention; and FIG. 4 is an exploded perspective view showing the shaft of the invention.

Referring to the drawings, there is shown therein a multi-unit rotary combustion engine composed of a plurality of rotary combustion engine units each generally designated at 10*a*, 10*b* and 10*c* respectively, with said multi-unit engine being composed of a multi-part housing comprising a plurality of peripheral walls 12*a*, 12*b* and 12*c* interconnected at each axial end with end walls 14 and 16 and intermediate walls or housings 18 and 20. The multi-part housing is disposed coaxially with the engine multi-part shaft 22, as illustrated, with the construction of the shaft 22 being described in greater detail below. As can be seen from FIG. 1, the interconnection of the peripheral walls, the end walls and intermediate walls serves to define three axially-spaced cavities although it will be understood that the invention is equally applicable to multi-unit engines having two or more axially-aligned rotary units and the invention is disclosed as a three-unit engine only for purposes of description. As further illustrated in FIG. 2, the inner surface 24 of each peripheral wall has a multi-lobed profile which preferably is basically an epitrochoid.

The multi-part shaft 22 of the invention extends through the entire engine and as stated above, is mounted coaxially with each of the cavities. A plurality of eccentric portions 26 are carried by the shaft with one eccentric portion being disposed in each of the cavities. A rotor 28 is rotatably mounted on each eccentric portion 26, only one such rotor being completely shown in FIG. 1, and as shown in FIG. 2 the rotors 28 have a plurality of circumferentially-spaced apex portions for sealing engagement with the inner surface 24 of the peripheral walls. Each rotor 28 carries a plurality of radially-movable seal strips 30, there being one mounted at each apex portion of the rotor 28, which seal strips 30 are disposed in sealing engagement with the inner surface 24 of the peripheral walls 12a, 12b and 12c. Intermediate seal bodies 32 are disposed at the ends of the apex portions to provide for sealing cooperation between the apex seals 30 and side seals 34 in each side face of the rotor which have sealing engagement with respective axially confronting faces of the end walls 14 and 16 and the intermediate walls 18. Working chambers 36 are formed between the inner surface of each peripheral wall and the outer peripheral surface of each rotor between its adjacent apex portions, which working chambers vary in volume as each rotor rotates relative to its respective housing. Each cavity is further provided with an intake port 38 for admitting air or a fuel-air mixture to the working chambers 36 for combustion therein, and ignition means such as a spark plug 40 illustrated in FIG. 2 may be provided in each cavity for igniting the fuel-air mixture, and an exhaust port 42 is also provided in each cavity for expelling the burnt gases from the engine so that during engine operation the phase of intake, compression, expansion and exhaust are carried out in each of the respective units of the engine. An oil seal 44 may also be provided radially inward of the side face seals 34 of each rotor for preventing any oil from leaking radially outwardly into the working chambers 36.

As also shown in FIGS. 1 and 2, the outer surface of each peripheral wall is provided with axially-spaced cooling fins 46 in the regions of the outer body having relatively high heat input which cooling fins 46 are operatively connected with supporting ribs 48 which together serve to keep the peripheral wall rigid during engine operation. The supporting ribs 48 are provided in the regions of the outer body having relatively low head intput. The fins 46 are enclosed by a baffle plate 50 to provide a plurality of closed cooling passages which may be supplied with cooling air by a suitable fan (not shown) for removing heat from the outer body. However, it should be understood that the engine is not to be limited to the air cooling system shown and that the engine may be cooled in any suitable manner as for example through liquid cooling so that the invention is not limited to the form of cooling.

Each rotor 28 has an internally-toothed gear 52 secured thereto (FIG. 1) which gear 52 may have an axially extending shank portion which serves as a bearing support for the rotor on the eccentric portion 26. However, a separate plane sleeve type bearing may be used for supporting the rotor and the gear 52 may be suitably bolted or otherwise secured to the rotor. The gear 52 for each rotor meshes with a fixed externally-toothed gear 54 which gear arrangement serves to guide the rotor in tracing its epitrochoidal path during rotation thereof. As is known in this type of engine, the rotor rotates relative to its eccentric portion while also describing a planetary motion relative to the outer body. Reference may be made to U.S. Patent 2,988,065 issued to Felix Wankel et al. for a more detailed description of the basic operation of engines of this type.

The output of a conventional piston and cylinder reciprocating-type internal combustion engine can be increased by additional piston and cylinder combinations. Similarly the output of rotary-type internal combustion engines can be increased by adding additional rotor and housing units, for example, by coupling the shafts of a plurality of said housing and rotor units together. It has also been proposed to construct such multi-unit rotary combustion engines with a single housing having a plurality of cavities for a corresponding number of rotors. Prior to the present invention however, it was believed that for structural reasons the most desirable construction would include a one-piece engine crankshaft for the multi-unit engine in that split crankshafts were heretofore believed to be structurally weak and also made assembly of the engine difficult. Even in embodiments using a one-piece crankshaft, for assembly reasons, it was required that the bearings, gears and/or intermediate housings be split for assembly purposes. Thus, even though the shaft could be constructed in one piece in these prior inventions, many of the elements were still required to be constructed in multi-piece fashion. Reference may be made to U.S. Patent 3,062,435 issued to Max Bentele on Nov. 6, 1962 and assigned to the assignee of the present application and copending application 248,705 filed Dec. 31, 1962, now Patent No. 3,193,187 and also assigned to the same assignee as the present application, for illustrations of multi-unit engines utilizing a one-piece shaft.

It has been known in the past to provide multi-part crankshafts for internal combustion engines or the like. These constructions normally included pilot pins, gear teeth, splines or clamping bolts. It has been found, however, that these constructions, due to the vibrations and loadings encountered during engine operation, would gradually wear and loosen to cause relative motion of the shaft parts which could ultimately result in destruction of the shaft. It is one purpose of the present invention to provide a multi-part crankshaft for a multi-unit internal combustion engine which does not suffer from these drawbacks.

In accordance with the present invention, a multi-piece crankshaft is provided for a multi-unit rotary combustion engine which is structurally sound and is relatively easy to assemble and disassemble thus rendering the assembly and disassembly of the entire engine relatively simple. Referring now to FIGS. 1, 3 and 4, the multi-piece shaft will now be described. As viewed left to right in said figures, the multi-piece shaft 22 comprises a first elongated shaft member 60 which extends from one axial end of the engine through the entire engine and out the opposite axial end thereof. The elongated shaft member 60 has an eccentric portion 26a integral therewith with said eccentric portion 26a being disposed in the cavity of the rotary engine unit 10a and supports a rotary 28 thereon. The shaft portion 60 is further provided with an annular shoulder portion 62 which shoulder portion 62 is disposed adjacent one axial end of the rotary engine unit 10b. Following the shoulder portion 62 of the shaft portion 60, the shaft portion 60 has a reduction in diameter so that a second shaft portion 64 may slide over the shaft portion 60 so that the eccentric portion 26b integral with said second shaft portion 64 may be disposed within the cavity of the rotary engine unit 10b. The second portion 64 has an annular shoulder portion 66 (FIG. 1) at the axially end thereof disposed adjacent the shoulder portion 62 on the first shaft portion 60 which shoulder portions 62 and 66 are disposed in abutting relationship, as illustrated in FIG. 1, and which will be explained in greater detail below. The second shaft portion 64 also has a shoulder portion 68 at its other axially end.

A third shaft portion 70 is disposed over the axially extending portion of the first shaft portion 60 adjacent the cavity of the engine unit 10c and has an integral eccentric portion 26c which is disposed in the cavity of said rotary combustion engine unit 10c. The third shaft portion 70 is provided with a shoulder portion 72 (FIG. 1), which is disposed in abutting engagement with the shoulder portion 68 on the second shaft portion 64 as will also be explained in greater detail below. It can also be seen in FIGS. 1, 3 and 4 that the extended portion of the first shaft portion 60 which extends beyond the first rotary engine unit 10b is provided with a plurality of splines circumferentially disposed around the shaft which splines 74 mate with internal splines 76 on the second and third shaft portions respectively. Although the splines may transmit some torque between the respective shaft portions, they are not intended primarily for this purpose but merely for locating or aligning the respective shaft portions 64 and 70 with the elongated shaft portion of the first shaft portion 60. The third shaft portion 70 has its axially end extending from the exterior of the end wall 16 and is provided with a tapered portion 78 over which is disposed a flywheel or output gear 80 which may drive an accessory or the like which gear member 80 has a tapered interior portion which mates with the tapered portion 78 of the third shaft portion 70. An output gear member 82 is disposed over an elongated first shaft portion 60 at its axially end thereof which gear member 82 has an elongated shaft portion with a flange 84 thereon which abuts against the inner diameter of the gear member 80, as illustarted. The first shaft portion 60 has threaded portions 86 and 88 at each end thereof for receiving nuts 90 and 92, respectively. Suitable washers 94 and 96 are respectively disposed between the nut 90 and the inner diameter of the gear member 98 at one axial end of the shaft portion 60 and nut 92 and the gear member 82 disposed at the opposite end of the shaft portion 60.

As explained above, the multi-piece shaft of the invention, when assembled, has characteristics substantially the same as a one-piece shaft. In order to bring about these characteristics, the nuts 90 and 92 are tightened at their respective ends to force the first gear portion 60 in an axially inward direction so that the shoulder 62 is forced against the shoulder 66 on the second gear portion and the shoulder 68 is in turn forced against the shoulder 72 on the third shaft portion. As the nut 92 is tightened from the other end it forces the gear member 82 against the flywheel or gear member 80, which through the tapered sections between the member 80 and the tapered portion 78 of the third portion of the shaft, forces said third portion axially inwardly so that its shoulder 72 is forced against the shoulder 68 in the second shaft portion and in turn the shoulder portion 66 of the second shaft portion is forced against the shoulder portion 62 of the first shaft portion. Thus, by suitably tightening nuts 90 and 92 the respective shaft portions are forced in tight friction relationship at their shoulder portions so that the shaft will turn as a one-piece shaft.

The shoulder portions of the respective shaft portions are disposed solely in friction contact and the shoulder portions are made so that the engagement therebetween is substantially a flat surface contact. Thus, the shoulders of the respective components of the shaft carry substantially all of the torque transmitted through the shaft by friction. It has been found that the coefficient of friction at the mating surfaces preferably should be within the range of 0.10 to 0.5 to insure that no slippage will occur at the mating surfaces of the respective shaft portions. However, it should be understood, that the coefficient of friction of the mating surfaces may vary depending upon the torque load intended to be carried by the shaft in a particular engine application. It has also been found that best resistance to slip can be provided by roughening the face surface of one of the mating shoulders on one shaft portion by grit blasting or the like and the other of said surfaces being formed so that it is smooth. As stated above, preferably the shoulder surfaces are formed so that they are flat but it has also been found that the surfaces can be slightly concave so that the greatest contact load is carried at the extreme radially inner and outer diameters of the mating shoulder portions. Thus, by providing a combination of sufficient axial clamping loading, coefficient of friction and effective contact area at the shoulder portions, maximum friction torque capacity can be obtained as well as maximum vertical shear capacity to give the shaft operating characteristics similar to a one-piece shaft.

In order to disassemble the engine, the nuts 90 and 92 are loosened and removed so that the shaft can be pulled apart at either end. For example, after the nuts 90 and 92 are removed the gear 82 may be suitably removed from the elongated first shaft section 60 with the gear member 80 and then the housing bolts 102 may be loosened so that the end wall 16 with the gear 54 and its sleeve bearing 100 may be removed. The eccentric portion 26c which is integral with the third shaft portion 70 will carry the rotor out of the engine which may be later removed from said eccentric portion, if desired. The intermediate housing 18 next in line can then be removed with its gear 54 and bearing 100 and the second shaft portion 64 can then be removed with its eccentric portion 26b and rotor 28. The next intermediate housing 18 will then follow and the remaining portion of the shaft 60 can be removed from the end wall 14. It will be seen therefore that each of the eccentric portions on the shaft is removed with its respective shaft portion so that there is no problem of having to fit the eccentric portions through the inner diameter or opening of its adjacent housing portion. The gear members 54 and their bearings 100 can be easily removed by removing the bolts 104 securing them to their respective housing without requiring that the gears and bearings be split as is the case in prior embodiments of multi-unit engines. It will further and importantly be noticed that none of the housing portions are required to be split as for example is the case in the aforementioned U.S. Patent No. 3,062,435.

It will be apparent from the above description that a novel multi-piece engine shaft is provided which provides for easy assembly and disassembly of the engine and does not require the use of split gears, bearings and housings thus eliminating any problem of weakening these members by causing them to be made in separable sections. The engine shaft is assembled merely by slipping the elements of the shaft on and off one another and by tightening them together by simple clamping means which holds the mating portions of the shaft in tight friction contact. By use of friction contact means as incorporated in the present invention the problem of wear at the mating elements in a multi-piece shaft is not present as was the case for example in multi-piece shafts having mating toothed elements or pin assembly arrangements which constructions were subject to wear due to vibration between these coupling elements of the shaft during turning and applied torque load. As stated above, the splines provided on the shaft are used primarily for the purpose of alignment and other means may be substituted therefore such as alignment pins or the like. Another advantage of the invention lies in its relatively simple construction which therefore allows for relatively simple manufacturing processes in order to construct the shaft elements.

While I have described my invention in detail in its present preferred embodiment, it will be obvious to those skilled in the art, after understanding my invention that various changes and modifications may be made therein without departing from the spirit and scope thereof. 1 aim in the appending claims to cover all such modifications.

I claim:

1. A rotary mechanism having an outer body including a plurality of coaxial peripheral walls, at least one intermediate wall interconnecting two adjacent peripheral walls, and a pair of axially-spaced end walls with one end wll being connected to each outer axial end of said rotary mechanism thereby forming a plurality of coaxially-spaced cavities; a rotor disposed in each of said cavities with said rotor being rotatable relative to said outer body; a multi-part shaft coaxially supported in said outer body for rotation relative thereto, said multi-part shaft including a first shaft portion extending axially through the entire outer body and having an eccentric portion integral therewith disposed in a first of said outer body cavities and having a rotor rotatably supported thereon and in driving engagement with said eccentric portion; at least one other shaft portion removably mounted with said first shaft portion with said other shaft portion having an eccentric portion integral therewith disposed in a second of said outer body cavities and having a rotor rotatably supported thereon in driving engagement with its said eccentric portion; coupling means on each of the shaft portions disposed in friction engagement with the coupling means on an adjacent shaft portion for maintaining said shaft portions in tight friction relationship such that uniform rotational movement is transmitted by the portions of said multi-part shaft.

2. A rotary mechanism as recited in claim 1 wherein said coupling means disposed in friction engagement includes an axially confronting face on each shaft portion with said axially confronting faces being disposed in mating friction contact with one another so that rotary motion of one of said shaft portions is transmitted to the other of said shaft portions.

3. A rotary mechanism as recited in claim 2 further comprising clamping means disposed at opposite axial ends of said shaft portions for clamping said axial confronting faces into tight mating friction engagement.

4. A rotary mechanism as recited in claim 2 wherein the surface of one of said axially confronting faces is smooth and the surface of the other of said axially confronting faces is roughened.

5. A rotary mechanism as recited in claim 1 further comprising indexing means for maintaining said shaft portions in predetermined relative rotational relationship.

6. A rotary mechanism as recited in claim 5 wherein said indexing means comprises a plurality of external splines on one of said shaft portions and a plurality of internal splines on the other of said shaft portions and the splines of said shaft portions being disposed in mating engagement for positioning said shaft portions relative to one another.

7. A rotary mechanism as recited in claim 1 wherein said peripheral walls, said end walls and said intermediate wall are each formed of one-piece construction and having openings therein for receiving said multi-part shaft with the diameter of the openings in said end walls and said intermediate wall being smaller than the diameter of each said eccentric portion.

8. In a multi-unit rotary mechanism having an outer body including a plurality of coaxially-spaced cavities and a rotor disposed in each of said cavities for rotation relative to said outer body; a multi-part shaft supported in said outer body and comprising a plurality of individual separable shaft portions, each of said shaft portions having an eccentric portion integral therewith disposed in an outer body cavity and carrying a rotor in driving relationship therewith; coupling means on each of said shaft portions for coupling said shaft portions together and including shoulder means on each of said shaft portions disposed in mating friction contact with the shoulder means of an adjacent shaft portion; and clamping means for maintaining said mating shoulder means in tight friction contact such that, during rotation of said multi-part shaft, uniform rotational movement is transmitted by the portions of said multi-part shaft.

9. In a multi-unit rotary mechanism as recited in claim 8 wherein said multi-part shaft includes a first shaft portion extending axially through the entire rotary mechanism and at least one other shaft portion disposed over one section of said first shaft portion with the relationship between said shaft portions being such that said one other shaft portion may be slipped on and off of said first shaft portion.

References Cited by the Examiner

UNITED STATES PATENTS

| | | | |
|---|---|---|---|
| 651,078 | 6/1900 | Liebman | 91—56 |
| 980,771 | 1/1911 | Glamzo | 91—56 |
| 2,341,231 | 2/1944 | Nordling | 91—56 |
| 2,635,552 | 4/1953 | Dale et al. | 103—126 |
| 2,642,808 | 6/1953 | Thomas | 103—126 |
| 2,665,638 | 1/1954 | Lauck | 103—126 |
| 3,062,435 | 11/1962 | Bentele | 230—158 |
| 3,096,746 | 7/1963 | Sollinger | 91—56 |
| 3,111,261 | 11/1963 | Bentele et al. | 230—145 |
| 3,193,187 | 7/1965 | Jones et al. | 230—145 |

FOREIGN PATENTS 557,902  12/1943  Great Britain.

DONLEY J. STOCKING, *Primary Examiner.*